March 2, 1937. J. R. JOHNSON 2,072,340
FEED MECHANISM FOR MACHINE TOOLS
Filed Oct. 14, 1935 2 Sheets-Sheet 2
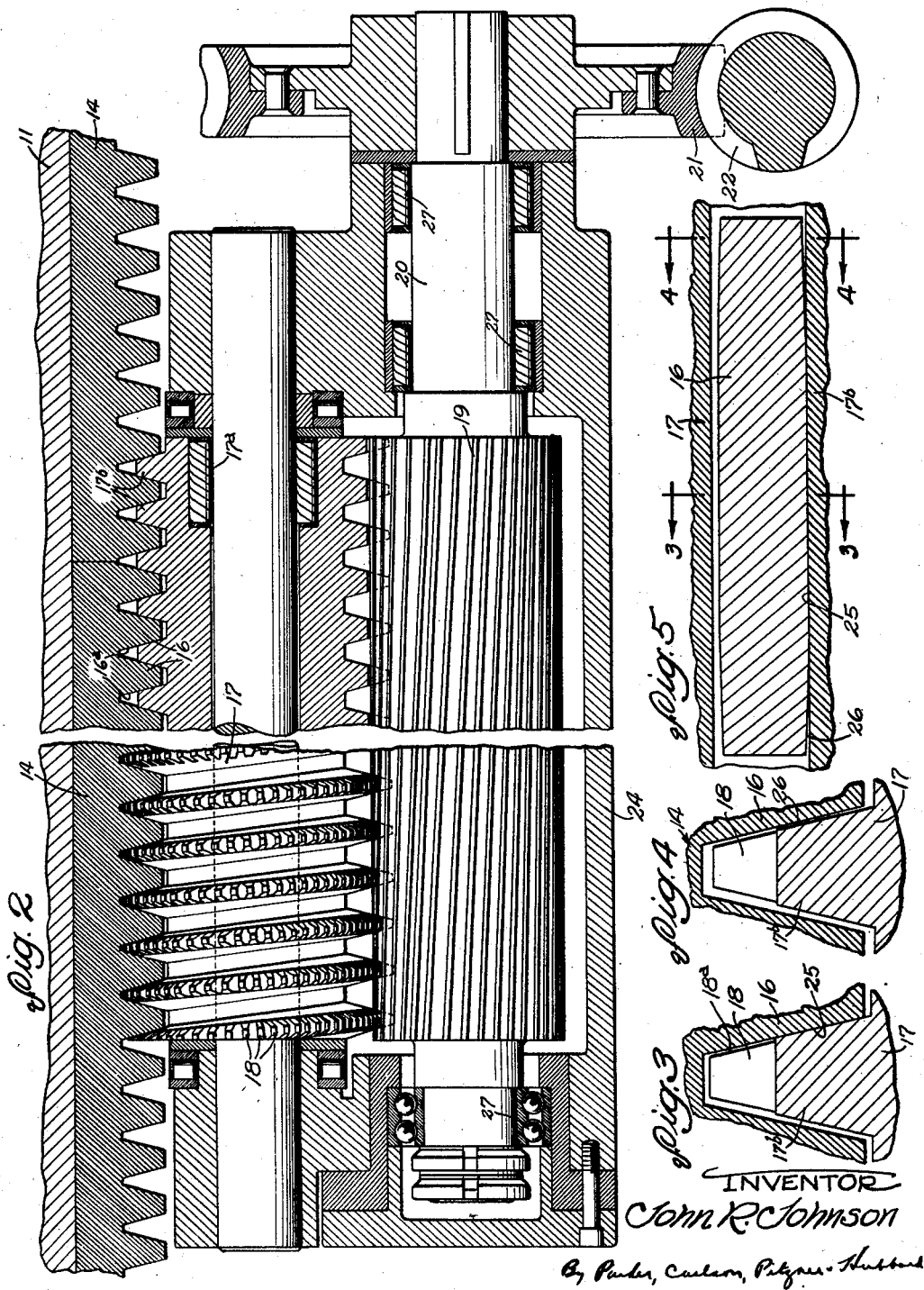
INVENTOR
John R. Johnson
By Parker, Carlson, Pitzner-Hubbard
ATTORNEYS Patented Mar. 2, 1937

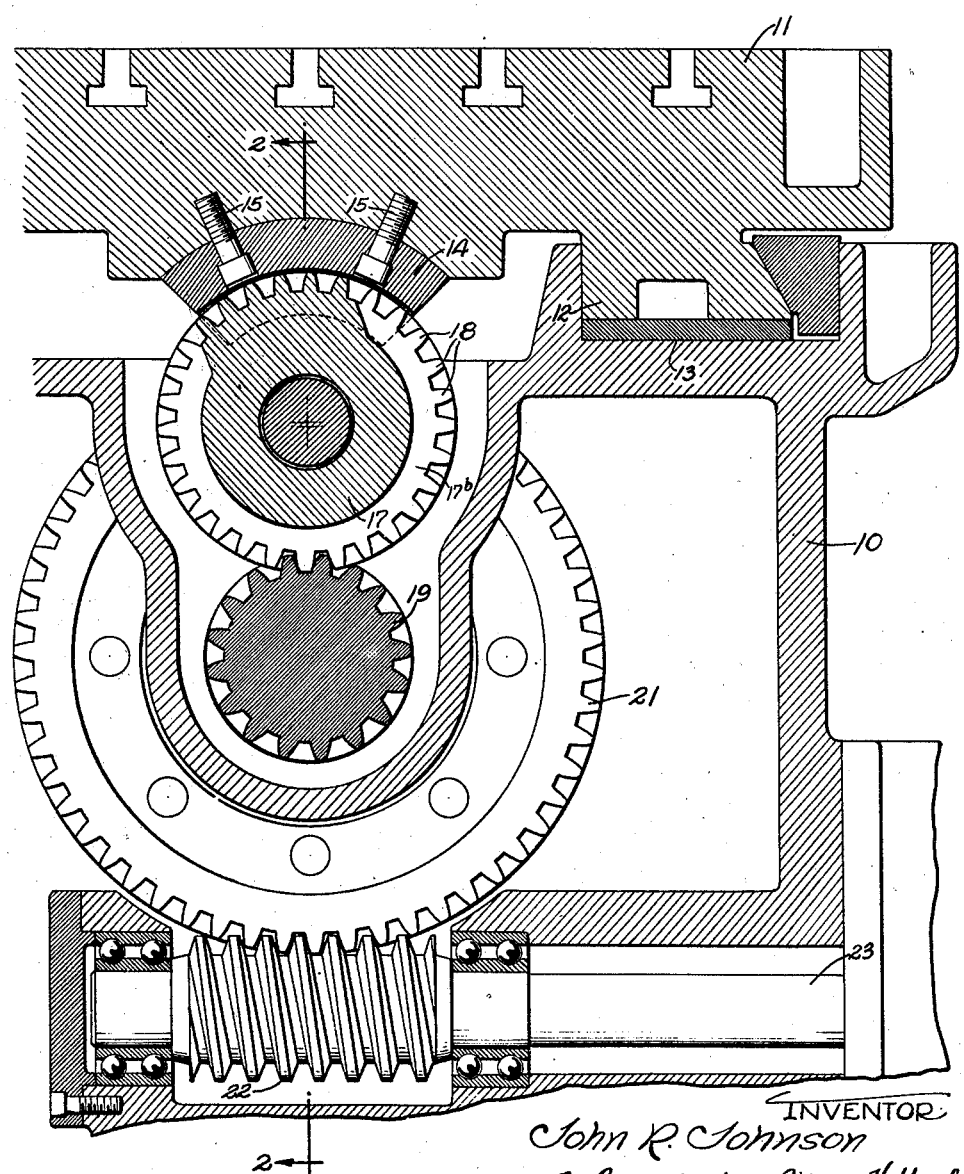

2,072,340

UNITED STATES PATENT OFFICE 2,072,340

FEED MECHANISM FOR MACHINE TOOLS

John R. Johnson, Rockford, Ill., assignor to The Ingersoll Milling Machine Company, Rockford, Ill., a corporation of Illinois Application October 14, 1935, Serial No. 44,882

16 Claims. (Cl. 74—57)

This invention relates to means for feeding or reciprocating a relatively heavy element, as, for example, the work table or carriage of a milling machine. To move a heavy work table requires the application of a correspondingly great amount of power and in order to prevent excessive wear or stresses it is important that the power be not concentrated at a relatively small area, but be applied to as large an area as possbile. Moreover, it is very desirable to eliminate play or backlash between the driving elements, in order that the work table shall be susceptible of being moved with precision and without vibration. It is also desirable to avoid the use of small bevel gears, and to be able to use a gear drive comprising a relatively long moment arm. Furthermore, it is desirable that the feed mechanism be of such nature as not to place any undue restriction upon the location of the driving motor. Provision should also be made for effective lubrication of the contacting surfaces of the feed mechanism.

The object of the present invention is to provide a feed mechanism which shall embody these desirable features.

In the accompanying drawings, Figure 1 is a vertical transverse sectional view of a machine tool embodying the features of my invention.

Fig. 2 is a longitudinal section on line 2—2 of Fig. 1.

Figs. 3 and 4 are sections on lines 3—3 and 4—4, respectively of Fig. 5.

Fig. 5 is a sectional view of the rack and worm comprised in the feed mechanism.

The embodiment which has been selected to illustrate the invention comprises a bed structure 10 on which a work table or carriage 11 is mounted, said carriage having flanges 12 which slide in guideways 13 on the bed.

One of the cooperating elements of the present feed mechanism is an elongated rack 14 rigidly secured as by screws 15 to the lower side of the table along the center thereof. In cross-section, as viewed in Fig. 1, the rack is curved and constitutes a segment of a nut, the teeth 16 of the rack being curved on a spiral and being portions of a screw thread. If desired, the rack may be formed in several sections secured to the table, end to end, as shown in Fig. 2.

The other cooperating element of the feed mechanism is a screw 17 which may be of any length necessary for the efficient application of power to the table, and which may be rotatably supported in the bed structure 10 in any preferred manner to extend longitudinally of the rack, as by means of bearings 17ª. As will be understood from the drawings, the screw 17 does not have any travel in an axial direction, rotation of the screw serving to produce longitudinal movement of the table 11.

If the screw 17 were to be driven by power applied to its axis, as in the prior art, it would be necessary to use a gear of small diameter since the screw is so close to the work table that there is no space for a gear of large diameter. The employment of a small gear would produce unfavorable leverage; moreover, the power to rotate the screw would be concentrated at one end thereof or at some other relatively small area, thus producing excessive stresses and wear. To overcome these objections I drive the worm 17 by power applied to its periphery preferably outwardly beyond the effective area of contact between the worm threads 17ᵇ and the rack teeth 16. To this end, the rack is under cut or otherwise formed to provide spaces 16ª for receiving gear teeth 18 cut in the thread of the worm beyond said contact area. Preferably end thrust on the gear teeth is relieved by cutting back the sides of the latter so as to provide clearance spaces 18ª as indicated in Fig. 3.

The toothed extensions 18 of the worm thread mesh with the teeth of a relatively long spiral gear 19 driven on a shaft 20 rotatably supported beneath the worm by bearings 21. Preferably, the pinion 19 is as long as the screw 17, thus distributing the application of power to the screw over as great an area as possible. It will be seen that instead of applying torque to one end of the screw I may apply the driving power throughout the length of the screw. By forming the gear teeth 18 in the outer portion only of the screw thread, provision is made for applying the driving power at a large effective radius without interrupting the helical continuity of the side surfaces of the major portion of the screw thread. The ability of the screw to withstand axial thrust of the magnitude encountered in large machine tools is thus effectually preserved.

The elongated driving gear 19 is located below the screw, thus spacing the axis of the driving gear farther from the table than would be the case if the driving gear were axially alined with the screw. I am thus enabled to employ a gear of relatively large diameter to drive the gear 19. Rigidly secured to the shaft 20 of the gear 19 is a worm wheel 21 of relatively long radius, said wheel meshing with a worm 22 on a drive shaft 23. Said shaft may be driven from a motor located at any convenient point suitable provision (not shown) being made for reversing the direction of rotation of the shaft.

It will be seen that the form of feed mechanism herein disclosed permits the application of ample power without subjecting the feed elements to excessive stresses or wear and without setting up objectionable vibration. The power is applied as directly as possible to the part which is to be driven (i. e., the work table 11); and backlash is reduced to the minimum.

By forming the rack 14 with teeth which constitute portions of a screw thread, each tooth of the rack is enabled to engage a side surface of substantial area on the thread of the screw 17, resulting in a multiple surface area of bearing contact between the rack and the screw instead of the multiple line contact obtained in the drive mechanisms heretofore generally used.

In order to provide for effective lubrication of the rack and screw, the following features are incorporated in the construction. The screw 17 and the pinion 19 are located within an oil reservoir 24 which in practice contains a suitable quantity of oil in which the pinion 19 and the lower portion of the screw 17 are submerged. By reason of the segmental form of the rack, the rack teeth are exposed at opposite ends so that the contacting surfaces of the rack teeth and the screw thread may be automatically lubricated by oil carried up from the reservoir 24 by the teeth of the pinion 19 and the thread of the screw 17. The cutting of teeth 18 on the periphery of the screw produces interdental spaces in which oil is carried up and into the interdental spaces of the rack to points above the main areas of contact between the rack and screw thread and effectually distributed to such areas.

To promote further lubrication of the contacting surfaces of the rack and the screw, the teeth of the rack and the thread of the screw are specially formed so that the effective contact area between them shall be disposed intermediate the ends of the rack teeth as indicated generally at 25 in Figs. 3 and 5, leaving clearance spaces 26 (Figs. 4 and 5) at opposite ends of the rack teeth into which the lubricant will be carried by the thread of the screw 17 and forced into the areas of contact. Such a construction may be obtained, for example, by cutting the rack teeth on a larger pitch diameter than the screw 17. When the rack and the screw are thus formed and mounted with the axis of the screw 17 offset slightly toward the rack, as shown in Fig. 1, the opposed surfaces of the rack teeth and the screw thread will engage each other through the contact area as shown in Fig. 5, but will not be in engagement at opposite sides of the rack. By virtue of the clearance spaces 26 thus formed, oil on the thread of the screw 17 is carried effectively into the contact areas 25, and this regardless of the direction of rotation of the screw. This construction and mounting is also advantageous in that it avoids the necessity of mounting the screw and the rack with their centers in accurate coincidence.

The drive mechanism above described is of simple and inexpensive construction, provides for distribution of the pressures over relatively large contact areas and insures effective lubrication of these areas. These features combine to reduce to a minimum the wear which will occur at the engaging surfaces of the rack and the screw in normal service operation.

The construction herein disclosed is of especial utility and value in large machine tools, as, for example, a cross-rail milling machine in which the reciprocating work table may weigh many tons.

The lubrication features herein shown are claimed broadly in my prior application Serial No. 755,702, filed December 3, 1934.

I claim as my invention:

1. The combination of a stationary part, a movable part, a partial nut fixed to one of said parts, a screw rotatably mounted on the other part and having a screw-thread engagement with the nut, the thread of said screw having gear teeth cut therein, and a power driven pinion meshing with said gear teeth to rotate the screw.

2. A machine having, in combination, relatively reciprocable machine elements, a partial nut connected to one of said elements, an elongated screw rotatably mounted on the other element and having a screw-thread engagement with the nut, the thread of said screw having gear teeth cut therein, an elongated pinion meshing with said teeth and of substantially the same length as the screw, and power driven means for transmitting rotary power to said pinion to rotate said screw.

3. A machine having, in combination, a support, a carriage movably mounted on the support, an elongated rack connected to the carriage, a screw rotatably mounted on the support and having a screw-thread engagement with the rack, the thread of said screw having gear teeth cut therein, said teeth being undercut with respect to said thread whereby said teeth are maintained out of contact with the teeth of said rack to minimize the end thrust thereon, a gear wheel meshing with said teeth, and means for driving the gear wheel.

4. A machine having, in combination, relatively reciprocable machine elements, a rack rigidly connected to one of said elements, a screw rotatably mounted and having a screw-thread engagement with the rack, the thread of said screw having gear teeth cut therein, a gear wheel meshing with said teeth, and a gear wheel of larger diameter than the first mentioned gear wheel and rigidly connected to one end of the first mentioned gear wheel for driving the latter.

5. A machine having, in combination, relatively reciprocable machine elements, a rack rigid with one of said elements, a gear element rotatably mounted on the other element and having teeth engaging the outer portion only of the rack teeth and extending longitudinally thereof, the outer end portions of said gear teeth being cut transversely of their length to form spaced teeth received in the interdental spaces between the rack teeth and out of contact therewith, a gear wheel meshing with said last mentioned teeth beyond the area of engagement between said gear element and said rack, and means to drive said gear wheel.

6. A machine having, in combination, relatively reciprocable machine elements, a rack connected to one of the elements, said rack being a segment of a nut, a screw rotatably mounted on the other element and having a screw-thread engagement with the rack, the thread of said screw having gear teeth cut therein, a gear wheel meshing with said teeth and of substantially the same length as the screw, and a gear wheel of larger diameter than the first mentioned gear wheel and rigid with relation to the first mentioned gear wheel for driving the latter.

7. A machine having, in combination, a support, a carriage movably mounted on the support, a rack connected to the lower side of the carriage, said rack being a segment of a nut, a screw rotatably mounted on the support below the rack and having a screw-thread engagement with the rack, the thread of said screw having gear teeth cut therein, a gear wheel below the screw and meshing with said teeth and of substantially the same length as the screw, and a gear wheel of larger diameter than the first mentioned gear wheel and rigid with relation to the first mentioned gear wheel for driving the latter.

8. A machine having, in combination, a stationary part, a part supported for reciprocation with reference to the stationary part, a screw rotatably mounted on one of said parts and engaging the other part to produce relative movement between said parts, the thread of said screw having gear teeth cut therein, a gear wheel meshing with said gear teeth to drive the screw, and means to supply lubricant to one of said elements, namely, the screw and the gear wheel, the spaces between said gear teeth serving to carry lubricant to the part that is engaged by the screw.

9. A machine having, in combination, relatively reciprocable machine elements, a rack rigid with one of said elements, a gear element rotatably mounted on the other element and having teeth engaging the outer portions only of the rack teeth and extending longitudinally thereof, the outer end portions of said gear teeth being cut transversely of their length to form spaced teeth received in the interdental spaces between the rack teeth, said spaced teeth being undercut with respect to said gear teeth whereby said spaced teeth are disposed out of contact with the teeth of said rack to minimize the end thrust thereon, a gear wheel meshing with said spaced teeth beyond the area of engagement between said gear element and said rack, and power actuated means for driving said gear wheel.

10. The combination with a reciprocable machine tool element such as a work table and a supporting element therefor, of an elongated straight rack rigid with one of said elements and constituting the segment of a nut, an elongated screw rotatably mounted on said other element to turn about an axis parallel to said rack and having threaded engagement with the outer portions only of the teeth on said rack, gear teeth formed in the periphery of said screw beyond the area of contact of said threaded engagement, and a power driven pinion for driving said screw meshing with said gear teeth and mounted to turn about an axis parallel to said screw axis, said pinion being held against axial movement and engaging said gear teeth throughout a substantial length of said screw.

11. A machine having, in combination, relatively reciprocable elements, an elongated rack connected to one of said elements, a screw rotatably mounted on the other element and having a screw thread engagement with the rack, the thread of said screw having gear teeth formed therein, a gear meshing with said gear teeth, and a power driven rotary member for transmitting rotary power to said gear for rotating said screw.

12. A machine having, in combination, relatively reciprocable elements, an elongated rack connected to one of said elements, a rotatably mounted screw having a continuous helical surface in threaded engagement with the rack, the thread of said screw having gear teeth formed therein outwardly beyond said continuous surface, a gear meshing with said gear teeth, and a power driven rotary member for transmitting rotary power to said gear for rotating said screw.

13. A machine having, in combination, a rack, a screw rotatably mounted and having a thread with continuous helical side surfaces in threaded engagement with the teeth of said rack, the peripheral portion of said screw thread outwardly beyond said continuous surfaces having gear teeth formed therein, and power driven means for transmitting rotary power to said screw at an effective radius greater than that of said screw surface including a gear wheel meshing with said gear teeth.

14. The combination of a support, relatively reciprocable machine elements, an elongated rack mounted on one of said elements and having teeth constituting segments of the thread of a nut, a worm of shorter axial length than said rack rotatably mounted on the other of said elements and having its thread meshing with the teeth of said rack, the thread of said worm having gear teeth formed on its periphery, a pinion rotatable but non-translatably mounted on said last mentioned element and meshing with the teeth on the periphery of said worm thread, a reservoir from which lubricant is supplied to said worm thread and teeth thereon to be carried thereby into the spaces between the teeth on said rack for lubricating the engaging thrust faces of said rack teeth and worm thread, and means for transmitting rotary driving power to said pinion for transmission therefrom through said worm to said rack bar.

15. A machine having, in combination, relatively reciprocable elements, a rack connected to one of said elements, a screw rotatably mounted on the other element and having screw thread engagement with the teeth of said rack, means for driving said screw, and a reservoir from which lubricating fluid is supplied to the thread of said screw, the periphery of the screw thread being formed with spaced notches constituting pockets for receiving said lubricating fluid and carrying the same into the spaces between said rack teeth for distribution to the contact areas between the screw thread and said teeth.

16. A machine having, in combination, a supporting element, an element slidable on said supporting element, an elongated rack connected to one of said elements, a rotatable member having a screw thread mating with the teeth of said rack and gear teeth extending longitudinally of the rack, a gear meshing with said gear teeth and rotatably mounted to turn on an axis disposed on the side of said member opposite said rack, a gear wheel coupled to said gear and mounted to turn on said axis, said wheel being of a radius greater than said gear but less than the distance between said axis and said rack, and power driven means for transmitting rotary power to the periphery of said second gear.

JOHN R. JOHNSON.